United States Patent [19]
Kato et al.

[11] Patent Number: 4,507,437
[45] Date of Patent: Mar. 26, 1985

[54] CURABLE COMPOSITION

[75] Inventors: Yasushi Kato; Hisao Furukawa, both of Kobe, Japan

[73] Assignee: Kanegafuchi Kagaku Kogyo Kabushiki Kaisha, Osaka, Japan

[21] Appl. No.: 564,905

[22] Filed: Dec. 23, 1983

[30] Foreign Application Priority Data

Dec. 30, 1982 [JP] Japan ................. 57-231829

[51] Int. Cl.$^3$ ................. C08F 8/00
[52] U.S. Cl. ................. 525/106; 525/100; 526/279; 528/21; 528/22; 528/23
[58] Field of Search ........... 525/100, 106; 526/279; 528/23, 21, 22

[56] References Cited

U.S. PATENT DOCUMENTS

| | | | |
|---|---|---|---|
| 4,191,713 | 3/1980 | Yonezawa et al. | 525/100 |
| 4,191,714 | 3/1980 | Yonezawa et al. | 525/100 |
| 4,278,783 | 7/1981 | Taniyama et al. | 525/100 |
| 4,282,336 | 8/1981 | Yonezawa et al. | 525/100 |
| 4,334,036 | 6/1982 | Yonezawa et al. | 525/100 |
| 4,371,664 | 2/1983 | Kato et al. | 525/100 |

Primary Examiner—Melvyn I. Marquis
Attorney, Agent, or Firm—Antonelli, Terry & Wands

[57] ABSTRACT

A moisture curable composition comprising (I) a hydrolyzable silyl group-containing vinyl polymer and (II) a combined curing catalyst system of (a) an organic phosphorus-containing compound such as an organic acid phosphate, an organic acid phosphite, or an acid titanium phosphate such as those known as titanate coupling agent and (b) an amine compound. The composition has well balanced pot life and curability and provides a cured product having an excellent appearance, and the curability can be arbitrarily controlled according to the purposes by selecting the ratio of the components (a) and (b).

13 Claims, No Drawings

CURABLE COMPOSITION

BACKGROUND OF THE INVENTION

The present invention relates to a moisture curable composition, and more particularly to a curable composition containing a hydrolyzable silyl group-containing vinyl polymer and having well balanced pot life and curability.

It is known that a silyl group-containing vinyl polymer having on the polymer chain end or the side chain thereof at least one silicon atom, to which a hydrolyzable group is linked, per one polymer molecule is curable by moisture, and is useful for providing a moisture curable composition. A composition containing the hydrolyzable silyl group-containing vinyl polymer and a hardener or curing catalyst such as an organo tin compound, an amine compound, an acidic compound or an acid phosphite compound is curable at low temperatures by moisture in the atmosphere to form a network structure, thus forming a cured product having excellent gloss, weathering resistance, discoloration resistance, solvent resistance, water resistance, heat resistance and hardness. It is possible to use the composition in various purposes, e.g. paint, adhesive, coating material and sealant, by utilizing the above excellent characteristics.

The curing characteristic of the hydrolyzable silyl group-containing vinyl polymer is greatly affected by the kinds of hardeners used, and accordingly selection of the hardeners suited for the purposes is indispensable. For instance, a paint composition containing the hydrolyzable silyl group-containing vinyl polymer, an acid phosphite compound and a solvent is poor in balance between the pot life, the curability and the appearance of the cured product, and may cause problems in practical use. That is to say, when the content of the acid phosphite compound is decreased, the pot life and the appearance are satisfactory, but the curability is poor. On the other hand, when the content of the acid phosphite compound is increased, the curability is satisfactory for practical use, but the pot life and the appearance are remarkably lowered.

It is an object of the present invention to provide a curable composition which has well balanced pot life and curability and provides a cured product having a good appearance.

A further object of the invention is to provide a curable composition, the curing characteristic of which can be arbitrarily controlled according to the purposes.

These and other objects of the present invention will become apparent from the description hereinafter.

SUMMARY OF THE INVENTION

It has now been found that a combination of a specific organic acid phosphate or acid phosphite compound and an amine compound is very useful as a hardener or curing catalyst for the hydrolyzable silyl group-containing vinyl polymer, and that contrary to the expectation that the catalytic activity would be lowered by the salt formation of the organic acid phosphate or acid phosphite compound with the amine compound, whereby the curability would be extremely lowered, the catalytic activity is scarcely lowered, and by the use of the combined catalyst system, the pot life of a composition and the appearance of the cured product are improved and moreover the curability of a composition is rather improved as compared with the single use of the organic acid phosphate or acid phosphite compound when cured with heating.

In accordance with the present invention, there is provided a curable composition comprising (I) a vinyl polymer having on the polymer chain end or the side chain thereof at least one silicon atom to which a hydrolyzable group is linked, per one polymer molecule, the main chain of the vinyl polymer consisting essentially of a polymer of a vinyl compound, and (II) a hardener containing (a) an organic phosphorus-containing compound having a P—OH linkage in the molecule and (b) an amine compound.

DETAILED DESCRIPTION

A polymer of which the main chain consists essentially of a polymer of a vinyl compound and which has on the polymer chain end or the side chain thereof at least one silicon atom combined with a hydrolyzable group, preferably at least two silicon atoms each combined with a hydrolyzable group, per one polymer molecule, is used in the present invention as a component (I). The vinyl compound includes, for instance, styrene, acrylates, methacrylates, maleic anhydride, acrylamide, N-methylolacrylamide, and the like, which may be employed alone or in admixture thereof. Most of such silyl groups of the polymers (I) are represented by the following formula:

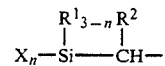

wherein X is a hydrolyzable group selected from the group consisting of a halogen, an alkoxyl group, an alkoxyalkoxyl group, an acyloxyl group, a ketoxymate group, amino group, an acid amide group, aminoxy group, mercapto group and an alkenyloxy group, $R^1$ and $R^2$ are hydrogen or a hydrocarbon group having 1 to 10 carbon atoms selected from the group consisting of an alkyl group, an aryl group and an aralkyl group, and n is an integer of 1 to 3.

The silyl group-containing vinyl polymers used as a component (I) in the present invention can be prepared by various processes, e.g. processes as disclosed in Japanese Unexamined Patent Publication (Tokkyo Kokai) No. 36395/1979, No. 123192/1979 and No. 63351/1982. A process by hydrosilylation of a vinyl polymer having a carbon-carbon double bond with hydrosilane and a process by copolymerization of a vinyl compound and a silyl compound having a copolymerizable double bond are industrially advantageous.

The silyl group-containing vinyl polymers used in the invention are desired to have a number average molecular weight within the range of 1,000 to 30,000, though the molecular weight thereof is not particularly limited thereto.

The silyl group-containing vinyl polymers containing units of an ethylenically unsaturated compound as a comonomer which has active hydrogen, e.g. carboxyl group, hydroxyl group, amino group and acid amide group, show a further improved adhesion property to substrates. The content of such a comonomer is usually from 0.1 to 10% by weight.

The hardener used in the present invention is a combined system of (a) an organic phosphorus-containing compound having a P—OH linkage and (b) an amine compound.

The organic phosphorus-containing compound (a) includes, for instance, organic acid phosphates of the general formulas:

$$(R^3O)_x(R^4O)_y\overset{O}{\overset{\|}{P}}(OH)_{2-m}$$

$$R^3_x R^4_y\overset{O}{\overset{\|}{P}}(OH)_{2-m}$$

wherein
$R^3$ and $R^4$ are an organic residue, m is 0 or 1, and x and y are 0, 1 or 2 provided that the sum of x and y is 1 or 2,
organic acid phosphites of the general formulas:

$$(R^3O)_x(R^4O)_yP(OH)_{2-m}$$

$$R^3_x R^4_y P(OH)_{2-m}$$

wherein $R^3$, $R^4$, m, x and y are as defined above, and an organic acid titanium phosphate containing a Ti—O—P—OH linkage.

Typical examples of the organic acid phosphate are $(CH_3O)_2POH$, $(CH_3O)P(OH)_2$, $(C_2H_5O)_2POH$, $(C_2H_5O)P(OH)_2$, $[(CH_3)_2CHO]_2POH$, $(CH_3)_2CHOP(OH)_2$, $(C_4H_9O)_2POH$, $(C_4H_9O)P(OH)_2$, $(C_8H_{17}O)_2POH$, $(C_8H_{17}O)P(OH)_2$, $(C_{10}H_{21}O)POH$, $(C_{10}H_{21}O)P(OH)_2$, $(C_{13}H_{27}O)_2POH$, $(C_{13}H_{27}O)P(OH)_2$, $(HO-C_8H_{16}O)_2POH$, $(HO-C_8H_{16}O)P(OH)_2$, $(HO-C_6H_{12}O)_2POH$, $(HO-C_6H_{12}O)P(OH)_2$, $[(CH_2OH)(CHOH)O]_2POH$, $[(CH_2OH)(CHOH)O]P(OH)_2$, $(C_4H_9OC_2H_4O)_2POH$, $C_4H_9OC_2H_4OP(OH)_2$, $(ClCH_2CH_2O)_2POH$, $ClCH_2CH_2OP(OH)_2$, $[(CH_2OH)(CHOH)C_4H_4O]_2POH$, $[(CH_2OH)(CHOH)C_4H_4O]P(OH)_2$, $$\left(\underset{2}{\langle C_6H_5\rangle}\right)P\text{-OH},\quad \langle C_6H_5\rangle P(OH)_2, \text{ and the like.}$$

Typical examples of the organic acid phosphite are $(CH_3O)_2POH$, $CH_3OP(OH)_2$, $(C_2H_5O)_2POH$, $C_2H_5OP(OH)_2$, $[(CH_3)_2CHO]_2POH$, $(CH_3)_2CHOP(OH)_2$, $(C_4H_9O)_2POH$, $C_4H_9OP(OH)_2$, $(C_8H_{17}O)_2POH$, $C_8H_{17}OP(OH)_2$, $(C_{10}H_{21}O)_2POH$, $C_{10}H_{21}OP(OH)_2$, $(C_{13}H_{27}O)_2POH$, $C_{13}H_{27}OP(OH)_2$, $(C_4H_9OC_2H_4O)_2POH$, $C_4H_9OC_2H_4OP(OH)_2$, $(ClCH_2CH_2O)_2POH$, $ClCH_2CH_2OP(OH)_2$, $$\left(\underset{2}{\langle C_6H_5\rangle}\right)POH,\quad \langle C_6H_5\rangle P(OH)_2,$$

and the like.

Typical examples of the organic acid titanium phosphate are:

$$(CH_3)_2CHOTi[O-\underset{OH}{\overset{O}{\overset{\|}{P}}}-O-\overset{O}{\overset{\|}{P}}(OC_8H_{17})_2]_3,$$

$$\overset{O}{\overset{\|}{\underset{CH_2-O}{C}}}\diagdown_{O}\diagup Ti[O-\underset{OH}{\overset{O}{\overset{\|}{P}}}(OC_8H_{17})]_2,$$

$$\underset{CH_2-O}{\overset{CH_2-O}{|}}\diagdown_{O}\diagup Ti[O-\underset{OH}{\overset{O}{\overset{\|}{P}}}-O-\overset{O}{\overset{\|}{P}}(OC_8H_{17})_2]_2,$$

$$(CH_3)_2CHOTi[O-\underset{OH}{\overset{O}{\overset{\|}{P}}}(OC_8H_{17})]_3,$$

$$\overset{O}{\overset{\|}{\underset{CH_2-O}{C}}}\diagdown_{O}\diagup Ti[O-\underset{OH}{\overset{O}{\overset{\|}{P}}}(OC_8H_{17})]_2,$$

$$\underset{CH_2-O}{\overset{CH_2-O}{|}}\diagdown_{O}\diagup Ti[O-\underset{OH}{\overset{O}{\overset{\|}{P}}}(OC_8H_{17})]_2,$$

$$(CH_3)_2CHOTi[O-\underset{OH}{\overset{O}{\overset{\|}{P}}}-O-\underset{(OC_4H_9)}{\overset{O}{\overset{\|}{P}}}(OC_8H_{17})]_3,$$

and the like.

The amine compounds (b) are not limited to particular ones, and any known amine compounds can be employed in the present invention. Examples of the amine compounds (b) are, for instance, primary amines such as methylamine, ethylamine, butylamine, hexylamine, laurylamine, hexamethylenediamine,

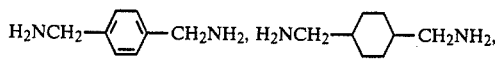

monoethanolamine and aniline; secondary amines such as diethylamine, dibutylamine, piperidine, piperazine and diethanolamine; tertiary amines such as triethylamine, tributylamine, N,N-dimethylhexylamine, N,N-dimethyldecylamine, N,N-dimethyldodecylamine, N,N-dimethylbenzylamine, N,N,N′,N′-tetramethyl-1,6-hexanediamine, triethylenediamine, triethanolamine and pyridine; polyfunctional amine compounds containing primary and secondary amino groups such as diethylenetriamine, triethylenetetramine and tetraethylenepentamine; adducts of primary or secondary amines and epoxy compounds; amino-substituted organoalkoxysilanes such as γ-aminopropyltrimethoxysilane, γ-aminopropyltriethoxysilane and N-β-aminoethyl-γ-aminopropyltrimethoxysilane; reaction products of amino-substituted organoalkoxysilanes with epoxy-containing silane compounds such as γ-glycidoxypropyltrimethoxysilane, e.g. a reaction product of γ-aminopropyltrimethoxysilane, γ-aminopropyltriethoxysilane or N-β-aminoethyl-γ-aminopropyltrimethoxysilane with γ-glycidoxypropyltrimethoxysilane; and the like.

The amount of the hardener [organic phosphorus-containing compound (a)+amine compound (b)] is selected from 0.01 to 20 parts by weight, preferably 0.1 to 16 parts by weight, per 100 parts by weight of the silyl group-containing vinyl polymer (I).

When the organic phosphorus-containing compound (a) and the amine compound (b) are admixed at ordinary temperature, heat is generated, and accordingly it is considered that a salt composed of equivalent amounts of the compounds (a) and (b) is formed. Therefore, the organic phosphorus-containing compound (a) and the amine compound (b) are employed in a (b)/(a) equivalent ratio of 0.05 to 20, preferably 0.1 to 10. When the (b)/(a) ratio is less than 0.05, the curing characteristic of the organo phosphorus-containing compound is not improved, and when the (b)/(a) ratio is more than 20, the curability of the composition is remarkably lowered and the composition tends to cause blushing owing to the amine compound.

The largest feature of the present invention resides in that the curing characteristic of the silyl group-containing vinyl polymer can be arbitrarily controlled according to the purposes by selecting the mixing ratio of the organic phosphorus-containing compound (a) and the amine compound (b), thus selecting the proportions of the three kinds of the active species as a hardener, namely the organic phosphorus-containing compound (a) which shows a high cure accelerating activity at ordinary temprature, the salt of the compounds (a) and (b) which shows a high cure accelerating activity at temperatures of not less than 60° C. and the amine compound (b) which lowers the ordinary temperature cure accelerating activity.

The compounds (a) and (b) may be added to the silyl group-containing vinyl polymer separately or in the form of a mixture previously prepred by mixing them in a predetermined ratio.

The composition of the present invention may be formed into either a two-package type that the silyl group-containing vinyl polymer (I) is admixed with the hardener (II) just before use, or a one-package type that a stabilizer is added to a mixture of the components (I) and (II) and the mixture is stored in a container in the watertight state and is used as it is.

A solvent may be employed in the present invention. In the fields of paints and coating materials, there are many cases where the composition is used in the state of being diluted with solvents. Solvents as used in general paints, coating compositions and so on can be used in the present invention, and include, for instance, aliphatic hydrocarbons, aromatic hydrocarbons, halongenated hydrocarbons, alcohols, ketones, esters, ethers, alcohol esters, ketone alcohols, ether alcohols, ketone ethers, ketone esters and ester ethers. The amount of the solvent varies depending on the molecular weight of the silyl group-containing vinyl polymer and the proportions of the used components, and is selected according to the concentration of solids matter or viscosity of the composition required in practical use.

The stability of the composition of the invention formulated into the one-package type is improved by the addition of an alcohol compound and/or a hydrolyzable ester compound.

The alcohol compound includes an alkyl alcohol and an ethylene glycol alkyl ether having a $C_1$ to $C_{10}$ alkyl group such as ethyl or butyl cellosolve. Preferable alkyl alcohols are those having a $C_1$ to $C_{10}$ alkyl group, such as methyl alcohol, ethyl alcohol, n-propyl alcohol, isopropyl alcohol, n-butyl alcohol, isobutyl alcohol, sec-butyl alcohol, tert-butyl alcohol, n-amyl alcohol, isoamyl alcohol, hexyl alcohol and octyl alcohol.

The hydrolyzable ester compound includes, for instance, a trialkyl orthoformate such as trimethyl orthoformate, triethyl orthoformate, tripropyl orthoformate or tributyl orthoformate; a hydrolyzable silicon compound of the general formula:

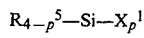

wherein $R^5$ is a monovalent organic group which may contain a functional group, $X^1$ is a hydrolyzable group, e.g. an alkoxyl group, an alkoxyalkoxyl group, phenoxy group, an acyloxy group, a ketoxymate group, amino group, aminoxy group, an acid amide group or an alkenyloxy group, and p is an integer of 1 to 4, especially 3 or 4, and a partial hydrolysis product of the hydrolyzable silicon compound. Typical examples of the hydrolyzable silicon compound and the partial hydrolysis product thereof are a tetraalkyl orthosilicate such as tetramethyl orthosilicate, tetraethyl orthosilicate, tetrapropyl orthosilicate or tetrabutyl orthosilicate, Ethyl Silicate 40 (commericial name of partially hydrolyzed ethyl silicate made by Nippon Unicar Co., Ltd.), methyltrimethoxysilane, methyltriethoxysilane, ethyltrimethoxysilane, ethyltriethoxysilane, phenyltrimethoxysilane, phenyltriethoxysilane, vinyltrimethoxysilane, vinyltriethoxysilane, γ-methacryloyloxypropyltrimethoxysilane, γ-mercaptopropyltrimethoxysilane, γ-glycidoxypropyltrimethoxysilane, γ-aminopropyltrimethoxysilane, γ-aminopropyltriethoxysilane and N-β-aminoethyl-γ-aminopropyltrimethoxysilane.

The above-mentioned stabilizer such as the alcohol compound or the hydrolyzable ester compound is employed in an amount of 0 to 300 parts by weight per 100 parts by weight of the component (I).

Also, the adhesion property of the composition is further improved by the addition of a silane coupling agent, or by the addition of a nitrogen-containing compound having at least one silicon atom combined with a hydrolyzable group in one molecule such as a reaction product of an amine type silane coupling agent and an epoxy compound, a reaction product of an epoxy type silane coupling agent and an amine compound or a reaction product of an amine type silane coupling agent and an epoxy type silane coupling agent.

The composition of the present invention may further contain usual additives such as fillers, pigments, ultraviolet absorbents, antioxidants, flatting agents and levelling agents in known effective concentrations.

The composition of the present invention is curable in a wide temperature range from ordinary temperature to a high temperature in a short perid of time, e.g. at 250° C. for 1 minute, and provides a cured product having excellent properties, e.g. adhesion property and weathering resistance. Therefore, the composition of the invention is useful for the various purposes, e.g. paints, coating materials, primers and adhesives for the surfaces of inorganic and organic materials. The composition is particularly suitable as an anti-corrosive finishing paint for a bridge, a top coat, an automotive refinishing paint and a paint for the surfaces of organic materials, because of curable at a low temperature.

It is possible to blend the composition of the invention with various resins used in paints, coating materials, primers and adhesives. Therefore, the composition of the invention can be admixed in suitable proportions, for instance, with lacquer, acrylic lacquer, thermosetting acrylic paint, alkyd paint, melamine paint, epoxy paint or silicone paint, whereby the physical properties such as adhesion property and weathering resistance of these paints or coatings can be improved.

The present invention is more specifically described and explained by means of the following Examples in which all parts and % are by weight unless otherwise noted. It is to be understood that the present invention is not limited to the Examples, and various changes and modifications may be made in the invention without departing from the spirit and scope thereof.

The following Reference Examples are also presented to illustrate the preparation of the silyl group-containing vinyl polymer and an amine compound.

REFERENCE EXAMPLE 1

To 350 g. of xylene heated at 110° C. was added dropwise under reflux over 5 hours a mixture consisting of 150 g. of styrene, 200 g. of butyl acrylate, 500 g. of methyl methacrylate, 150 g. of γ-methacryloyloxypropyltrimethoxysilane and 45 g. of azobisisobutyronitrile. A mixture of 5 g. of azobisisobutyronitrile and 100 g. of xylene was further added dropwise to the system over 1 hour, and the post-polymerization was then conducted for 2 hours. The solid content of the obtained reaction mixture in the form of a solution was 69%. The viscosity of the solution was 70 poises at 25° C. The thus prepared silyl group-containing vinyl polymer had a number average molecular weight of 5,000 measured by gel permeation chromatography.

REFERENCE EXAMPLE 2

To 450 g. of xylene heated at 110° C. was added dropwise under reflux over 5 hours a mixture consisting of 150 g. of styrene, 300 g. of butyl acrylate, 430 g. of methyl methacrylate, 100 g. of γ-methacryloyloxypropyltrimethoxysilane, 20 g. of acrylamide and 9 g. of azobisisobutyronitrile. A mixture of 1 g. of azoisobutyronitrile and 9 g. of xylene was further added dropwise over 1 hour, and the post-polymerization was then conducted for 2 hours to give a solution having a solid content of 64% and a viscosity of 250 poises at 25° C. The thus prepared silyl group-containing vinyl polymer had a number average molecular weight of 16,000.

REFERENCE EXAMPLE 3

To a one liter flask were added 222 g. of N-β-aminoethyl-γ-aminopropyltrimethoxysilane and 236 g. of γ-glycidoxypropyltrimethoxysilane, and they were reacted at 90° C. for 4 hours in a nitrogen atmosphere with agitation. In an infrared absorption spectrum of the obtained light yellow liquid, it was observed that the absorption for the primary amine at 1,590 cm.$^{-1}$ was decreased, and an absorption for epoxy group at 910 cm.$^{-1}$ was not observed.

REFERENCE EXAMPLE 4

To a one liter flask were added 221 g. of γ-aminopropyltriethoxysilane and 236 g. of γ-glycidoxypropyltrimethoxysilane, and they were reacted at 90° C. for 4 hours in a nitrogen atmosphere with agitation. In an infrared absorption spectrum of the obtained light yellow liquid, it was observed that the absorption for the primary amine at 1,590 cm.$^{-1}$ was decreased, and an absorption for epoxy group at 910 cm.$^{-1}$ was not observed.

EXAMPLES 1 TO 7 AND COMPARATIVE EXAMPLES 1 AND 2

Prescribed amounts of dioctyl phosphate (DOP) as an organic phosphorus-containing compound (a) and the amine compound (b) shown in Table 1 were admixed at ordinary temperature, and diluted with methanol and xylene to give a hardener solution containing the compound (a) in a concentration of 10%.

To the solution of the silyl group-containing vinyl polymer obtained in Reference Example 1 was added 3 parts of tetraethyl orthosilicate per 100 parts of the silyl group-containing vinyl polymer. After adjusting the concentration of the solid matter to 40% with xylene, the hardener prepared above was added to the mixture to give a curable composition.

A soft steel plate was previously coated with a lacquer primer surfacer and polished, and the obtained composition was sprayed on the coated steel plate. After allowing to stand at 15° C. for 30 minutes for setting, the curability, pot life and other physical properties were measured.

The above procedure was repeated except that the organic phosphorus-containing compound or amine compound was employed alone as a hardener.

The results are shown in Table 1.

EXAMPLES 8 AND 9 AND COMPARATIVE EXAMPLE 3

Dioctyl phosphate (DOP) or dibutyl phosphate (DBP) as an organic phosphorus-containing compound (a) and N,N-dimethyldodecylamine (MDA) as an amine compound (b) were admixed at ordinary temperature in prescribed amounts shown in Table 2, and diluted with methanol and xylene to give a hardener solution containing the compound (a) in a concentration of 10%.

To the solution of the silyl group-containing vinyl polymer obtained in Reference Example 2 was added 3 parts of tetraethyl silicate per 100 parts of the silyl group-containing vinyl polymer. After adjusting the concentration of the solid matter to 35% with xylene, the hardener prepared above was added to the mixture to give a curable composition.

The curability, pot life and other physical properties were measured in the same manner as the preceding Examples except that the spray-coated composition was allowed to stand at 15° C. for 30 minutes for setting and then stoved at 100° C. for 10 minutes.

The above procedure was repeated except that the organic phosphorus-containing compound (a) was employed alone as a hardener.

The results are shown in Table 2.

In the Examples, the measurement was made as follows:

APPEARANCE

An image was reflected in a clear coating of the composition formed on the above-mentioned lacquer undercoat, and the definition was observed.

CURABILITY (1) Masking property: The initial curability was estimated by, after setting a coating, sticking a masking tape (pressure-sensitive adhesive tape made by Nitto Electric Industrial Co., Ltd.) onto the coating at a prescribed temperature at prescribed intervals and measuring the time till when a mark of the tape was not left on the coating or observing the state of the mark of the tape.

(2) Pencil hardness: The pencil hardness of the cured coating was measured according to JIS K 5400.

POT LIFE

In a 100 ml. cup was placed 50 g. of the composition. It was allowed to stand at 30° C. in the opened state, and the time up to skinning was measured.

ADHESION PROPERTY

The adhesion between the lacquer undercoat layer and the clear coating layer was estimated by cross-cutting the coating and peeling off with a cellophane adhesive tape.

TABLE 1

| | Hardener (PHR) | | | Pot life at 30° C. (hour) | Masking property (hour) | | Appearance | Pencil hardness | Adhesion Property |
|---|---|---|---|---|---|---|---|---|---|
| | (a) | (b) | (b)/(a) by equivalent | | at 15° C. | at 60° C. | After 30 min. at 60° C. and 7 days at room temp. | | |
| Ex. 1 | DOP(1) | MDA(0.31) | 0.5 | 5 | 15 | 1.0 | Δ | 2H | O |
| Ex. 2 | DOP(1) | MDA(0.47) | 0.75 | 8 | 30 | 1.0 | O | H | O |
| Ex. 3 | DOP(1) | MDA(0.94) | 1.5 | 20 | 72 | 1.0 | O | H | O |
| Ex. 4 | DOP(1) | LA(0.41) | 0.75 | 4 | 15 | 0.5 | Δ | 2H | O |
| Ex. 5 | DOP(1) | PP(0.19) | 0.75 | 6 | 20 | 0.83 | O | H | O |
| Ex. 6 | DOP(1) | Ref. Ex. 3 (0.34) | 0.5 | 6 | 20 | 1.0 | O | H | O |
| Ex. 7 | DOP(1) | Ref. Ex. 4 (0.67) | 0.5 | 6 | 20 | 1.0 | O | H | O |
| Com. Ex. 1 | DOP(1) | — | — | 2 | 6 | 2.5 | Δ | H | O |
| Com. Ex. 2 | — | PP(1) | — | >24 | >150 | >4.0 | O | HB | O |

(Notes)
PHR: part per 100 parts of silyl group-containing vinyl polymer
DOP: dioctyl phosphate, MDA: N,N—dimethyldodecylamine
LA: laurylamine, PP: piperidine
O: excellent, Δ: good

TABLE 2

| | Hardener (PHR) | | | Pot life at 30° C. (hour) | Masking property (after 10 min. at 100° C.) | Pencil hardness | Adhesion property |
|---|---|---|---|---|---|---|---|
| | (a) | (b) | (b)/(a) by equivalent | | | After 10 min. at 100° C. | |
| Ex. 8 | DOP(1) | MDA(0.63) | 1 | 12 | slightly leaving mark | F | excellent |
| Ex. 9 | DBP(1) | MDA(0.98) | 1 | 8 | no abnormality | H | excellent |
| Com. Ex. 3 | DOP(1) | — | — | 3 | remarkably leaving mark | 2B | excellent |

In addition to the ingredients used in the Examples, other ingredients can be used in the Examples as set forth in the specification to obtain substantially the same results.

What we claim is:

1. A curable composition comprising (I) a vinyl polymer having on the main polymer chain end or a side chain thereof at least one silyl group containing a silicon atom to which a hydrolyzable group is linked, per one polymer molecule, the main chain of the vinyl polymer consisting essentially of a polymer of a vinyl monomer, and (II) a hardener containing (a) at least one organic phosphorus-containing compound having a P—OH linkage in the molecular and being selected from the group consisting of organic acid phosphates of the general formulas:

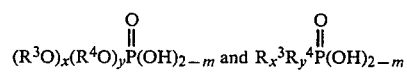

wherein $R^3$ and $R^4$ are an organic group, m is 0 or 1, and x and y are 0, 1 or 2 provided that the sum of x and y is 1 or 2; organic acid phosphites of the general formulas:

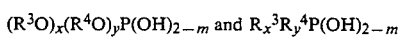

wherein $R^3$, $R^4$, m, x and y are as defined above, and an organic acid titanium phosphate containing a

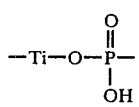

linkage between organic groups and (b) an amine compound reactable with the at least one organic phosphorus-containing compound.

2. The composition of claim 1, wherein said amine compound (b) is a secondary or tertiary amine.

3. The composition of claim 1, wherein said amine compound (b) is an amino-substituted organoalkoxysilane.

4. The composition of claim 1, wherein said amine compound (b) is a reaction product of an amino-substituted organoalkoxysilane with an epoxy-containing silane compound.

5. The composition of claim 1, wherein said hardener (II) is present in an amount of 0.01 to 20 parts by weight per 100 parts by weight of the vinyl polymer (I).

6. The composition of claim 5, wherein the ratio of the component (b) to the component (a) is from 0.05 to 20 by equivalent.

7. A composition of claim 6, wherein said silyl group is represented by the following formula:

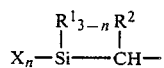

wherein X is a hydrolyzable group selected from the group consisting of a halogen, an alkoxyl group, an alkoxyalkoxyl group, an acyloxyl group, a ketoxymate group, an amino group, an acid amide group, an aminoxy group, a mercapto group and an alkenyloxy group, $R^1$ and $R^2$ are hydrogen or a hydrocarbon group having 1 to 10 carbon atoms selected from the group consisting of an alkyl group, an aryl group and an aralkyl group, and n is an integer of 1 to 3.

8. A composition of claim 1, wherein said organic phosphorus-containing compound is selected from the group consisting of:

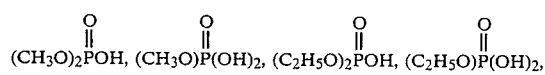

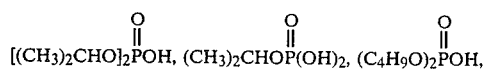

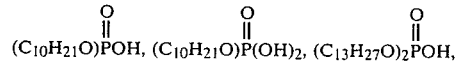

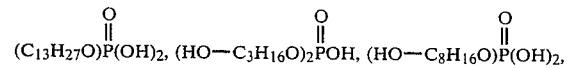

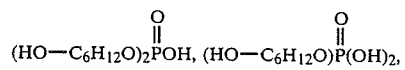

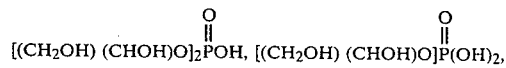

-continued

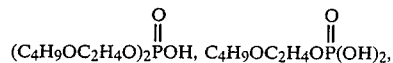

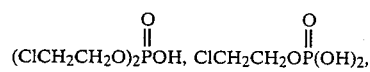

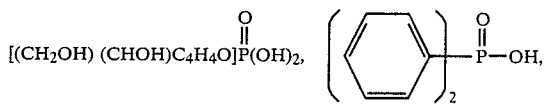

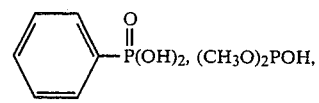

$CH_3OP_3(OH)_2$, $(C_2H_5O)_2POH$, $C_2H_5OP(OH)_2$,
$[(CH_3)_2CHO]_2POH$, $(CH_3)_2CHOP(OH)_2$, $(C_4H_9O)_2POH$,
$C_4H_9OP(OH)_2$, $(C_8H_{17}O)_2POH$, $C_8H_{17}OP(OH)_2$, $(C_{10}H_{21}O)_2POH$,
$(C_{10}H_{21}OP(OH)_2$, $(C_{13}H_{27}O)_2POH$, $C_{13}H_{27}OP(OH)_2$,
$(C_4H_9OC_2H_4O)_2POH$, $C_4H_9OC_2H_4OP(OH)_2,(ClCH_2CH_2O)_2POH$,

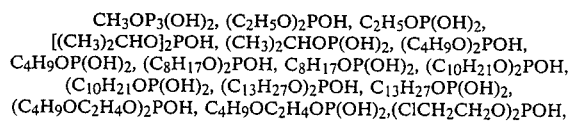

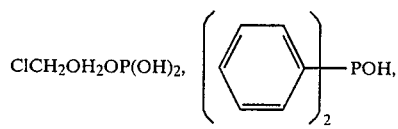

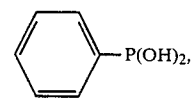

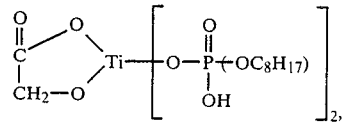

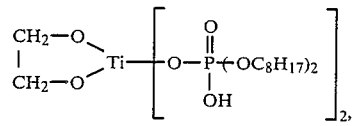

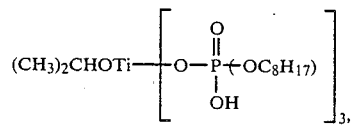

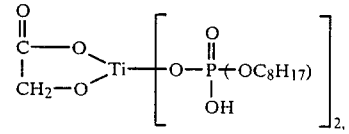

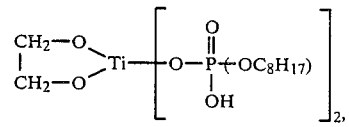

and

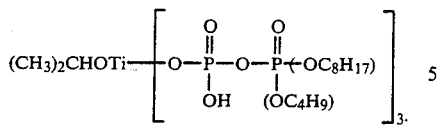

9. The composition of claim 8, wherein said amine compound is selected from the group consisting of methylamine, ethylamine, butylamine, hexylamine, laurylamine, hexamethylenediamine,

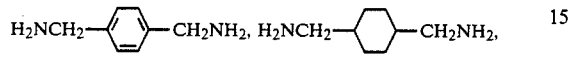

aniline, diethylamine, dibutylamine, piperidine, piperazine, diethanolamine, triethylamine, tributylamine, N,N-dimethyldodecylamine, N,N-dimethylbenzylamine, N,N,N',N-tetramethyl-1,6-hexanediamine, triethylenediamine, triethanolamine, pyridine, diethylenetriamine, triethylenetetramine, tetraethylenepentamine, adducts of primary or secondary amines and epoxy compounds, γ-aminopropyltrimethoxysilane, γ-aminopropyltriethoxysilane, N-β-aminoethyl-γ-aminopropyltrimethoxysilane and reaction products of amino-substituted organoalkoxysilanes with epoxy-containing silane compounds.

10. A composition of claim 1, wherein said organic acid titanium phosphate is selected from the group consisting of

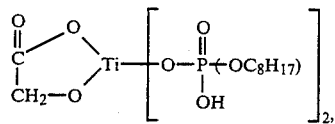

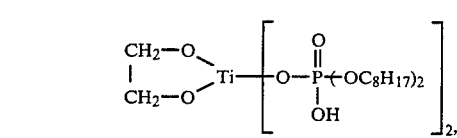

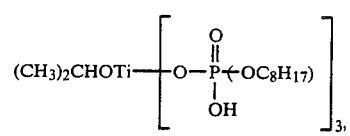

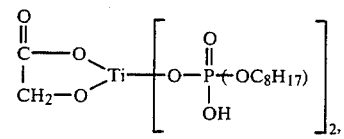

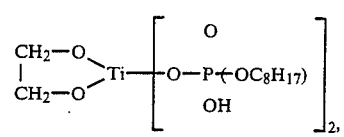

and

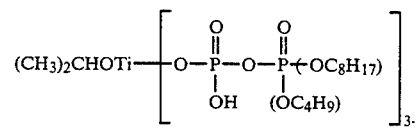

11. The composition of claim 1, wherein the amine compound is selected from the group consisting of a primary amine, a secondary amine, a tertiary amine, a polyfunctional amine compound containing primary and secondary amino groups, and adduct of primary or secondary amine and an epoxy compound, an amino-substituted organoalkoxysilane, and a reaction product of amino-substituted organoalkoxysilane and epoxy-containing silane compound.

12. The composition of claim 1, wherein the organic phosphorus-containing compound is selected from the group consisting of dioctylphosphate and dibutylphosphate and the amine compound is selected from the group consisting of N,N-dimethyldodecylamine, laurylamine and piperidine.

13. The composition of claim 1, wherein the ratio of the component (b) to the component (a) is from 0.05 to 20 by equivalent.

* * * * *